United States Patent [19]
Damasky et al.

[11] Patent Number: 5,647,657
[45] Date of Patent: Jul. 15, 1997

[54] LIGHT SYSTEM FOR AN INTERIOR OF A MOTOR VEHICLE

[75] Inventors: Joachim Damasky; Detlef Decker, both of Lippstadt; Hubert Flottmeyer, Wuennenberg; Willi Fockers; Ulrich Helfmeier, both of Lippstadt; Franz-Gerhard Jost, Arnsberg; Juergen Kabst, Lippstadt; Heinrich Vogt, Borchen; Burkard Woerdenweber, Lippstadt, all of Germany

[73] Assignee: Hella KG Hueck & Co., Lippstadt, Germany

[21] Appl. No.: 552,061

[22] Filed: Nov. 2, 1995

[30] Foreign Application Priority Data

Nov. 5, 1994 [DE] Germany ............... 44 39 547.7

[51] Int. Cl.⁶ ................................................. B60Q 3/02
[52] U.S. Cl. ........................... 362/32; 362/74; 362/80; 362/26
[58] Field of Search .................... 362/32, 74, 26, 362/61, 83.1, 83.3, 135, 28, 136, 80, 802, 295

[56] References Cited

U.S. PATENT DOCUMENTS

| | | | |
|---|---|---|---|
| 4,788,630 | 11/1988 | Gavagan | 362/80 |
| 5,143,437 | 9/1992 | Matsuno et al. | 362/80 |
| 5,400,225 | 3/1995 | Currie | 362/32 |
| 5,452,186 | 9/1995 | Dassanayake | 362/32 |
| 5,488,545 | 1/1996 | Kato et al. | 362/80 |

FOREIGN PATENT DOCUMENTS

| | | |
|---|---|---|
| 3434536A1 | 3/1986 | Germany |
| 3838770A1 | 6/1989 | Germany |
| 4201657A1 | 10/1992 | Germany |
| 4212361A1 | 3/1993 | Germany |
| 4311359A1 | 10/1993 | Germany |
| 4131425C2 | 4/1994 | Germany |
| 4330721C1 | 8/1994 | Germany |

*Primary Examiner*—Ira S. Lazarus
*Assistant Examiner*—Thomas M. Sember
*Attorney, Agent, or Firm*—Griffin, Butler, Whisenhunt & Kurtossy

[57] ABSTRACT

A light system for an interior space of a motor vehicle comprises a plurality of function groups, each comprising a plurality of light-creation units (LE). Each light creation unit has an electrically activated and deactivated light source (LQ) and a reflector (R) for concentrating light from the light source. At least one light conductor (LL) is associated with each light creation unit with its first end being coupled to the light creation unit for transmitting concentrated light, the light conductor including a plurality of flexible individual light conductors (EL), and there being a light emitting unit (E) at a second end of the light conductor for illuminating a surface. The light sources of a single function group are simultaneously activated and deactivated. The light-creation units are spatially distributed in the motor vehicle so as to reduce the lengths of the light conductors. The light system has at least one entering and exiting illumination function group and a orientation illumination function group.

15 Claims, 7 Drawing Sheets

LIGHT SYSTEM FOR AN INTERIOR OF A MOTOR VEHICLE

BACKGROUND OF THE INVENTION

This invention concerns a light system for the interior of a motor vehicle of a type having: at least one light-creation unit which respectively comprises an electrically activated and deactivated light source and a reflector for concentrating light from the light source; at least one light conductor whose first end is coupled to the light creation unit for transmitting concentrated light, the light conductor including a plurality of flexible individual light conductors; at least one light emitting element at a second end of the light conductor to directly or indirectly illuminate surfaces and symbols.

Lights are increasingly arranged in interior areas of motor vehicles for improved comfort of drivers and passengers. In addition to well-known ceiling and reading lamps, which are to some extent arranged in many different ways in motor vehicles, individual lights are increasingly mounted in interiors of motor vehicles to illuminate surfaces and symbols. Each individual lamp has thereby an electrically switchable light source and must have a connection to a main power supply of the motor vehicle via an electrical wire and a switch. Light systems of this kind require expensive wire networks, are expensive to install, and, because of the many light sources (or bulbs) required, need extensive maintenance.

A light system for a passenger interior space of a motor vehicle is disclosed in German Offenlegungsschrift DE 42 01 657 A1 in which, in order to reduce expenses for a cable network and thereby reduce electrical conductors required in a motor vehicle for coupling individual lamps, a multiplex data system is employed. Such a multiplex system requires however expensive, cost intensive, electrical components and does not contribute to a reduction in the number of individual light sources so that this system also has high maintenance costs as well.

German Offenlegungsschrift DE 38 38 770 A1 discloses an illumination system for a motor vehicle which can be constructed of illumination subsystems. One of these illumination subsystems is a light system for the interior space for a motor vehicle. This light system has a light creation unit which includes an electrically activated and deactivated light source and a reflector for concentrating light from the light source. The light system also has a light conductor whose first end is coupled to the light creation unit for transmitting the concentrated light (the light conductor being formed of a plurality of flexible, or bendable, individual light conductors) and whose second end is coupled to at least one light emitting element in the interior space of the motor vehicle. It has proven to be detrimental in this known system that only one central light source is provided for handling all light functions in the interior space of the motor vehicle. Thus, the light source must be of a high intensity type whereby a temperature problem is created in an area of the light source and an inconvenient energy balance is brought about. The reason for this unfavorable energy balance is that, in order to supply all of the light emitting elements in the motor vehicle, unduly great light conductor lengths are necessary and light switching elements must be provided in the light conductors for handling various light functions, so that light produced from the single light source is insufficiently used. Further, it proves to be disadvantageous that when the only light source burns out, light is no longer available in the interior of the motor vehicle for any light functions.

It is an object of this invention to provide a light system for the interior of a motor vehicle that makes possible an optimal illumination of all surfaces and symbols to be illuminated in the vehicle, that achieves a higher energy efficient level, that makes possible an uncomplicated electrical switching of functioning units and that can be more easily maintained and mounted.

SUMMARY OF THE INVENTION

According to principles of this invention, a light system for an interior of a motor vehicle includes at least first and second light creation units each of which, together with their respective light conductors and light-emitting elements, form a function group. The light system further includes a mechanism to simultaneously activate and deactivate the light sources of a single function group. The light creation units are spatially distributed in the motor vehicle so as to reduce the lengths of their light conductors. There is further included a mechanism for switching on and off a first function group in response to a changing position of an element for accessing the interior of the motor vehicle, such as a door. Also included is a mechanism for activating and deactivating a second function group in response to a stand-light being switched on or off. Thus, the first function group creates entering and exiting illumination and the second function group creates orientation, or general, illumination.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
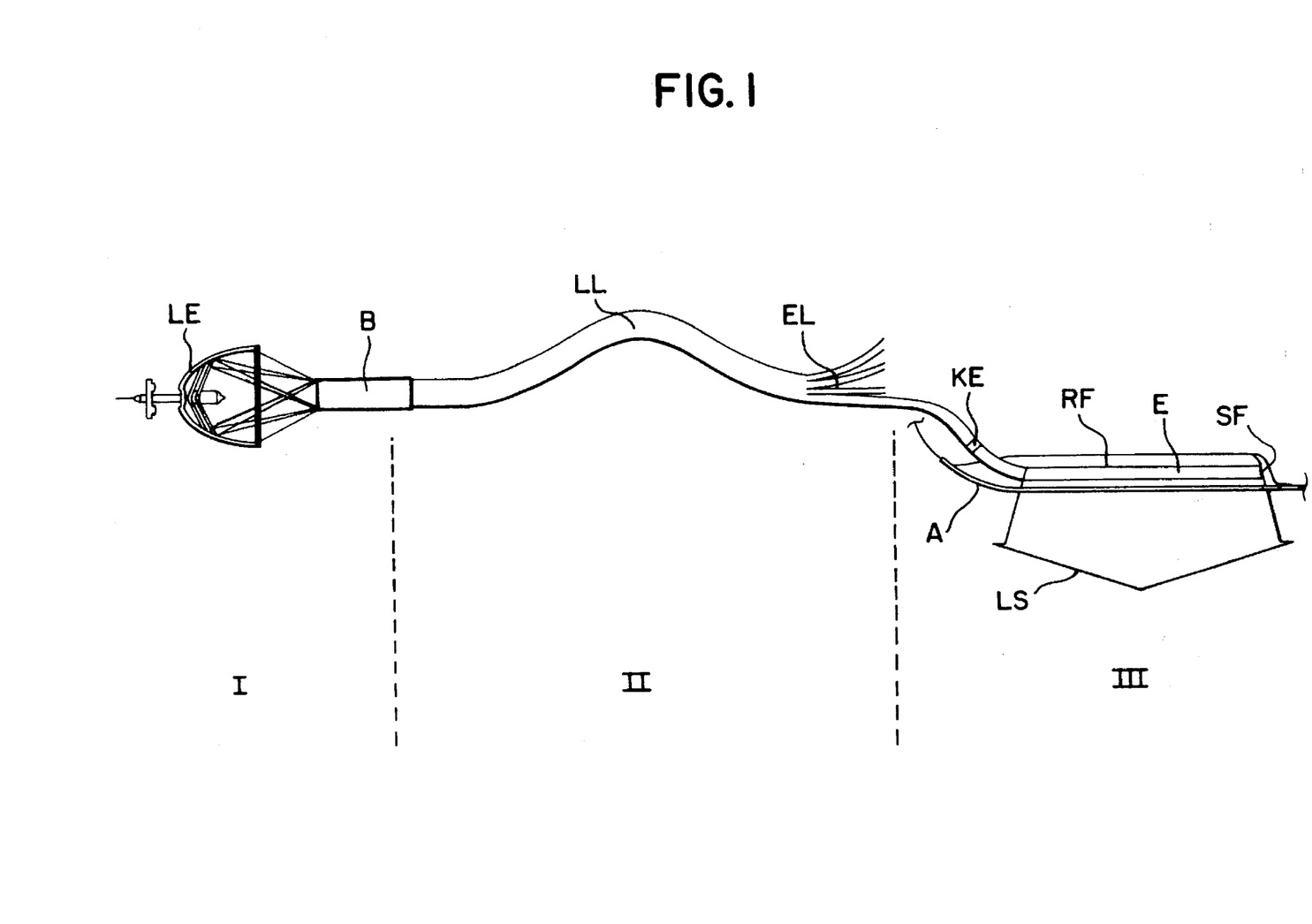
FIG. 1 is a schematic representation of the structure of a component of the light system of this invention.

FIG. 1 shows schematically the structure of a component of a function group of a light system according to this invention. Each such component comprises three parts. Part I is a light creation unit LE. Part II is a light conductor LL which is divided into a plurality of individual light conductors EL. Part III is at least one light emitting element E that has the function of a lamp for an interior space of a motor vehicle. The light conductor LL, in a preferred embodiment, is coupled to the light creation unit LE by a thermal uncoupling (heat blocking) component B. The coupling between the light creation LE and the light conductor LL can preferably be releasable. The light conductor LL, and thereby the individual light conductors EL, can be made of resinous plastic or from glass fiber. The individual light conductors EL which are directed toward the light emitting elements E can themselves form the light emitting elements or, also, as is shown in FIG. 1, can be releasably connected to separate light emitting elements E via coupling elements KE, with the light emitting elements E being formed as lamps. In the embodiment depicted in FIG. 1 an individual light conductor EL is coupled to a light emitting element E via a coupling element KE, with this element E also being formed as a light conductor which here, for example, creates light rays LS which correspond to a desired light distribution, with its back side having a reflective surface RF thereon which, for example, can be formed of prisms or of a roughened or frosted surface. The light emitting element E can, as is shown here, have a mirror surface SF at its outer end so as to make better use of available light. In order to integrate the light emitting element E in the interior of a motor vehicle in a best possible manner, it is provided with a light transmitting cover A or it can be mounted in a light transmissive element A. Depending upon the amount of light necessary for a respective illumination function of the light emitting element E, one or more individual light conductors EL can be releasably coupled to the light emitting element E or can themselves form the light emitting element E. An indirect illumination function is created by the representative light emitting element depicted in FIG. 1, via the light conductor (or light guide). In other embodiments free ends of the individually light conductors EL can also be used to provide direct illumination. The cover A can influence light distribution in a well known manner.

At least two components of the type shown in FIG. 1, comprising a light creation element LE, a light conductor LL and at least one light emitting element E, form a function group of the light system. In order to reduce the length of the light conductor, and thereby to improve light efficiency, the light creation units LE are spatially distributed in the motor vehicle. In order to make possible an uncomplicated switching on and off (activation and deactivation), light sources LQ of a function group are switchable simultaneously on and off.

Figure 2:
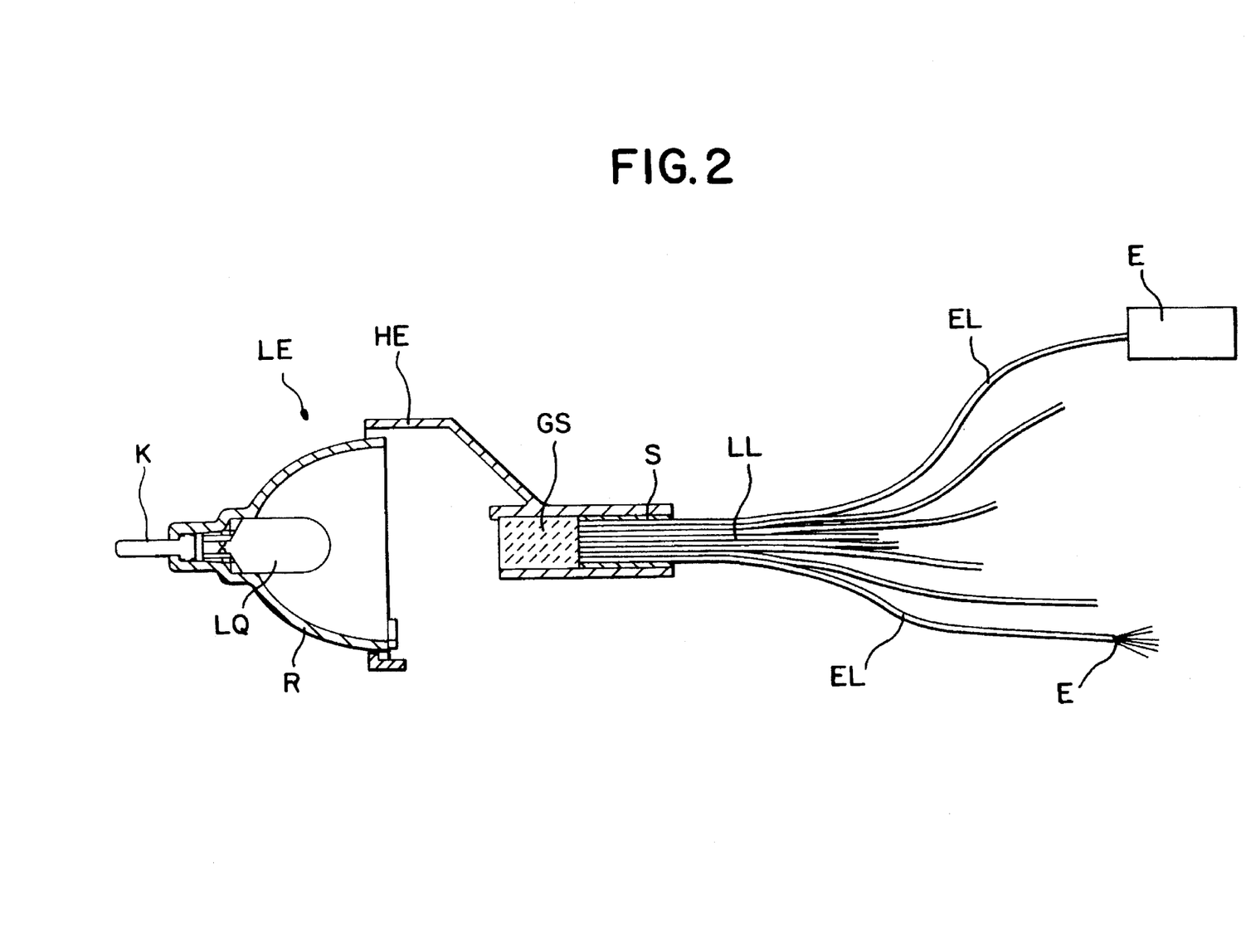
FIG. 2 is a side cross-sectional view, partially schematic, of a first embodiment of this invention according to FIG. 1.

FIG. 2 shows an embodiment according to the structure of FIG. 1. The light creation unit LE includes the light source LQ, with electrical contacts K, which are arranged in a reflector R which is preferably elliptically shaped. The reflector R is coupled with a holding element HE in which the light conductor LL can be releasably placed. The holding element HE has, for this purpose, a tubularly shaped part in which, between the light source LQ and the light conductor LL, a glass rod GS is arranged for thermal uncoupling (or heat blocking). This glass rod GS makes possible also a homogenizing, or harmonizing, of light distribution. In the embodiment shown here the holding element HE has openings at its outer periphery so that a thermal exchange takes place between the light creation unit LE and surrounding environment. To ensure that the light conductor LL, which comprises individual light conductors EL, is properly held and mounted, it is, for example, mounted to the holding element HE via a casing S. As has been already described relative to FIG. 1, the individual light conductors EL can be used directly as light emitting elements E or can be coupled with separate light emitting elements E.

Figure 3:
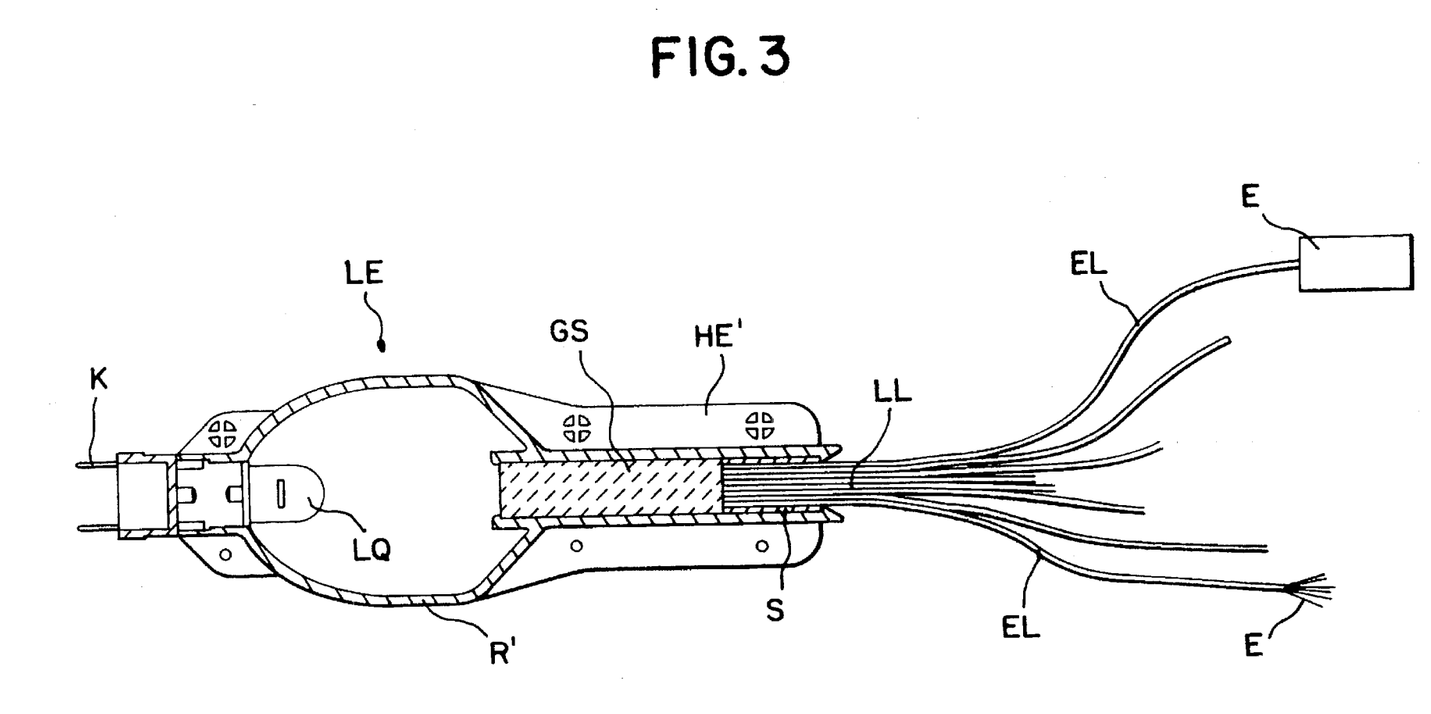
FIG. 3 is a cross-sectional view, partially schematic of a second embodiment of the invention according to FIG. 1.

FIG. 3 shows a further embodiment of the light creation unit LE. This light creation unit LE also has a light source LQ with electrical contacts K, a reflector R' and a holding element HE'. In this embodiment parts of the reflector R' and the holding element HE' are formed as one monolithic element and can be formed as a combination of two housing parts. Also in this embodiment the holding element HE' has a cylindrical portion which, for example, receives the glass rod GS to thermally uncouple and the light conductor LL (whose end portion is held in the cylindrical-shaped portion by casing S). It can also be recognized in FIG. 3 that the individual light conductors EL can lead into light emitting elements E in various manners.

Figure 4:
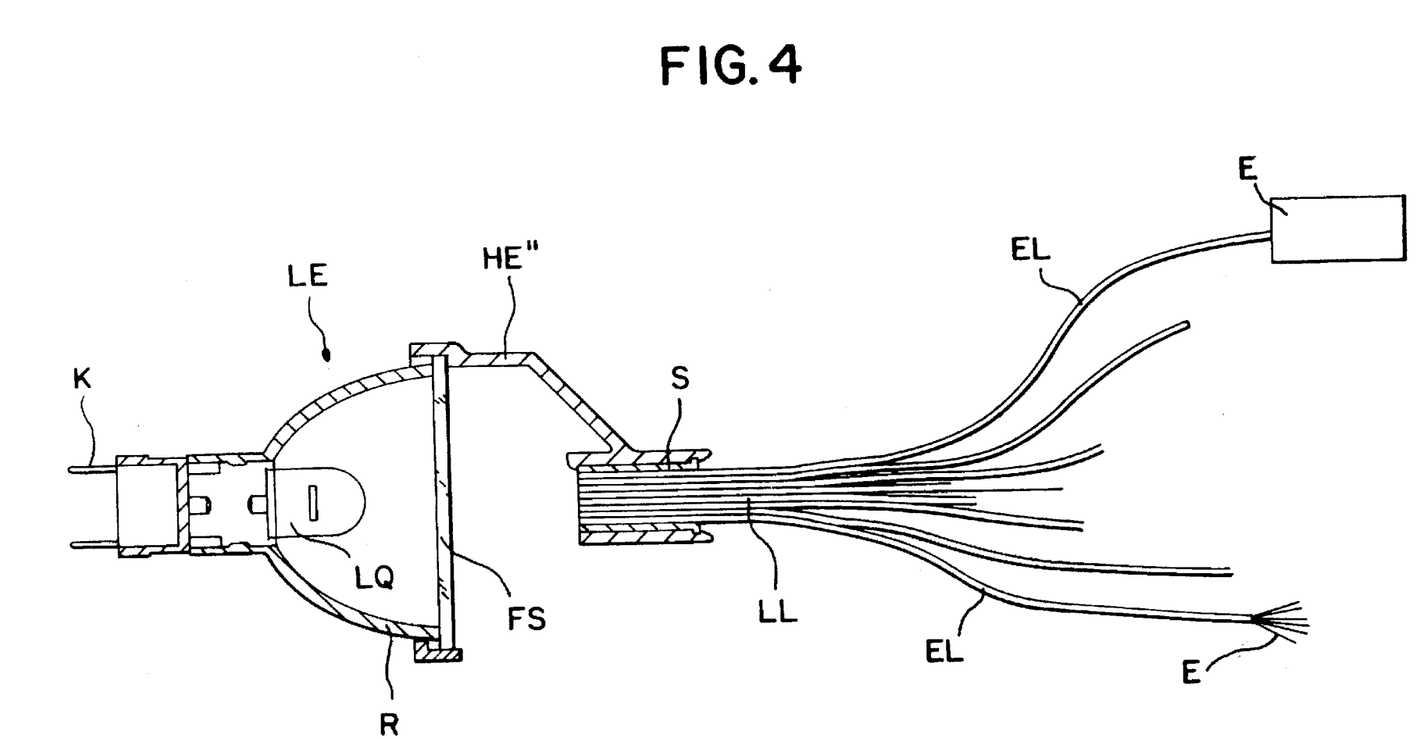
FIG. 4 is a cross-sectional view, partially schematic, of a third embodiment of the invention according to FIG. 1.

FIG. 4 depicts an embodiment which corresponds to the embodiment of FIG. 2 with the difference that in FIG. 4 a filter disc FS is arranged between the reflector R and a holding element HE" which can serve to thermally uncouple (or isolate) and/or homogenize the light. The filter disc FS is thereby arranged between the light source LQ (which has electrical contacts K), and the light conductor LL (which is likewise releasably mounted to the holding element HE" via the casing S). The light conductor LL also here has individual light conductors EL which are coupled with light emitting elements E. In all of the embodiments depicted in FIGS. 1–4 the thermal uncoupling components B, GS, FS can include color filters in order to, for one light function, maintain a uniform color of light to be emitted. The reflectors R are preferably elliptically-shaped reflectors so that first focus points of the reflectors R are arranged at positions of light creation of the light sources LQ and second focus points are arranged at uncoupling surfaces of the light conductors LL, or glass rods GS.

In order to improve the energy efficiency level, the light sources can have power capacities smaller than or equal to 10 Watts. In this regard, any off-the-shelf suitable light source LQ can be used. In another embodiment the light source can also be formed as a light emitting diode which, for example, has an integrated reflector or is arranged relative to an auxiliary reflector and which is coupled to the light conductor via a holding element HE.

The light source can also radiate colored light.

The releasable attachments between the light conductors LL, the individual light conductors EL, the individual light conductors EL and the light emitting element E, and the light conductors LL and the light creating units LE can be formed as clamp, snap-on, or screw attachments. The light conductor LL, and its individual light conductors EL, can, preferably, be separable at separation points of two auto body parts or other motor vehicle parts. In this regard, as is shown in FIG. 1, coupling elements KE can be used to make possible releasable connections. Such coupling elements KE can also allow the light conductor LL, or individual light conductors EL, to be divided into further light conductors LL or individual light conductors EL or, by integrating color filters, allow a coloring for a partial area of a light function.

Figure 5:
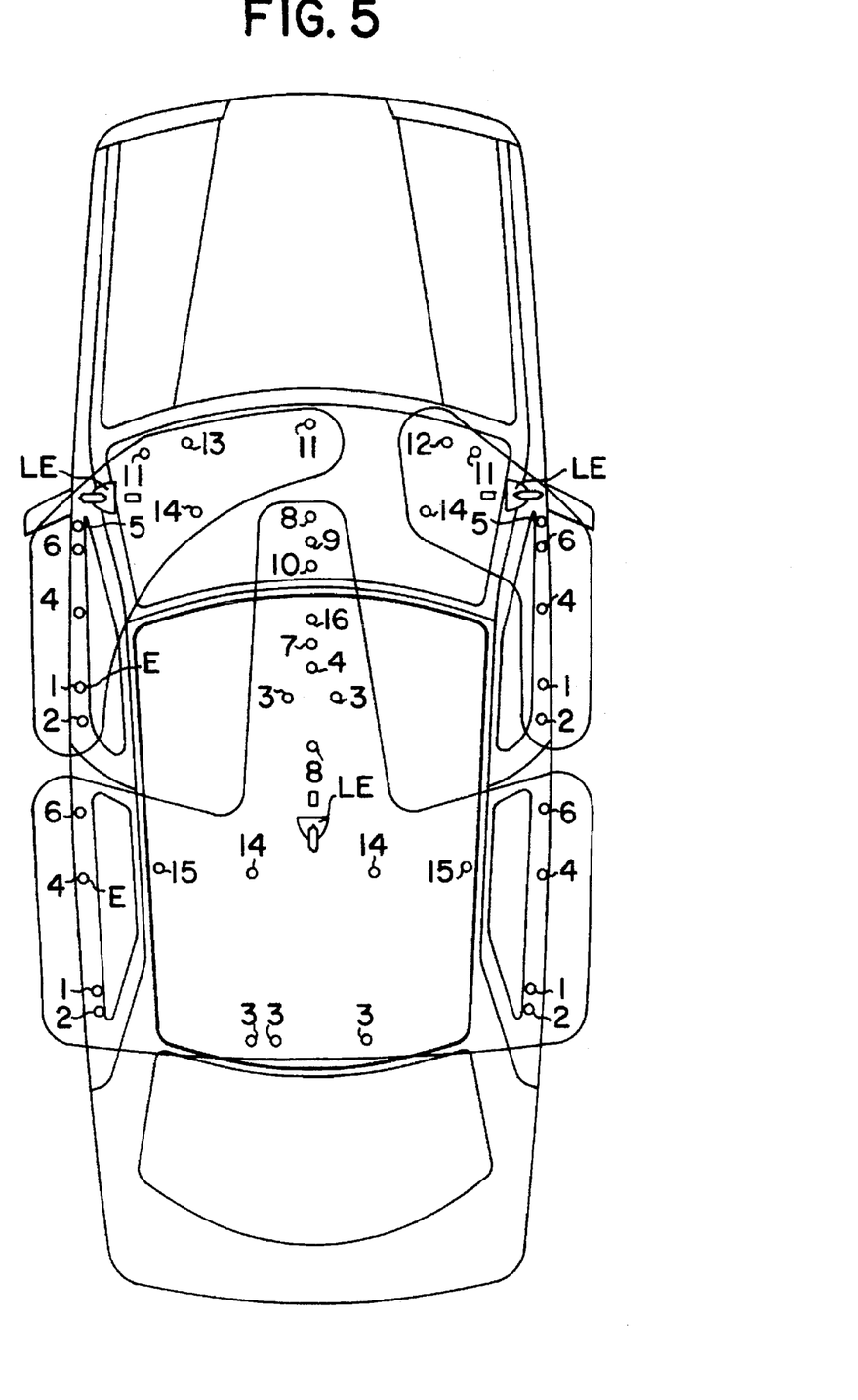
FIG. 5 is a top schematic view of a motor vehicle with an arrangement of light creation units and light emitting units of this invention, with an orientation-illumination function group, being shown thereon schematically.

FIG. 5 shows an embodiment of the arrangement of light creation units LE and the light emitting elements E which are coupled to the light creation units LE via the light conductors LL which are not shown here. The schematic representation shown in FIG. 5 corresponds to an orientation-, or general-illumination function group for an interior of a motor vehicle. Three light creation units LE with their respective light conductors LL (which are not shown here) and the light emitting elements E form a function group. The light sources LQ of the light creation units LE of this function group are simultaneously turned on and off. It can be seen from FIG. 5 that the light creation units LE are spatially distributed in the motor vehicle to reduce the length of the light conductors LL (which are not shown here). The light emitting elements E, which are to be provided with light, of each light creation unit LE are delineated in that each of them is enclosed in an imaginary box. The light emitting elements shown in FIG. 5 are as follows:

1 door handle
2 door lock
3 belt buckle
4 storage receivers
5 mirror adjustment
6 window handle
7 hand brake
8 ashtray
9 gear lever
10 level regulator
11 air vents
12 handle and glove compartment
13 fuse box
14 foot space
15 holding handle
16 sunroof Each of the listed elements is provided with direct or indirect illumination from a lamp (lighting). These lamps are formed as light emitting elements which, in the casing of the foot space illumination 14, provide a direct illumination or, however, for example for the air vents 11, create lamp surfaces and thereby represent an indirect lighting function or, however, also, as for the gear lever 9, indirectly illuminate symbols on the gear lever.

The switching on and off of the general-illumination function group of FIG. 5, which for example also can be completed by a dashboard illumination, is caused by the switching on and off of a standing light of the motor vehicle. The on and off switching of the light sources LQ of the light creation units LE take place simultaneously.

In order to achieve an uncomplicated mounting and easy maintenance, the light creation units LE are arranged in closed, however accessible, spaces behind an interior covering of the motor vehicle. For the same reason the light conductors LL can preferably be separated at separation lines between two body parts, for example, between a door and a body frame; or other motor vehicle parts, such as for example between a central console and a motor vehicle base chassis or a door interior covering and a door. Because the light creation units LE are also separable from the light conductors and the light conductors LL, EL are separable from the light emitting elements E, they are easily mountable and maintenance friendly.

By arranging color filters between the light sources LQ and the light emitting elements E an adjustment of the color of light to fit light functions can be achieved in an uncomplicated manner. By choosing light sources with power capacities of less than, or equal to, 10 Watts, a particularly beneficial energy efficiency level can be achieved. By switching the light sources on and off in dependence upon brightness in the interior space of the motor vehicle, the energy efficiency level can be improved still further. When this is done, also an energy-saving dimming of the light source, depending on brightness in the interior space of the motor vehicle, is useful.

Figure 6:
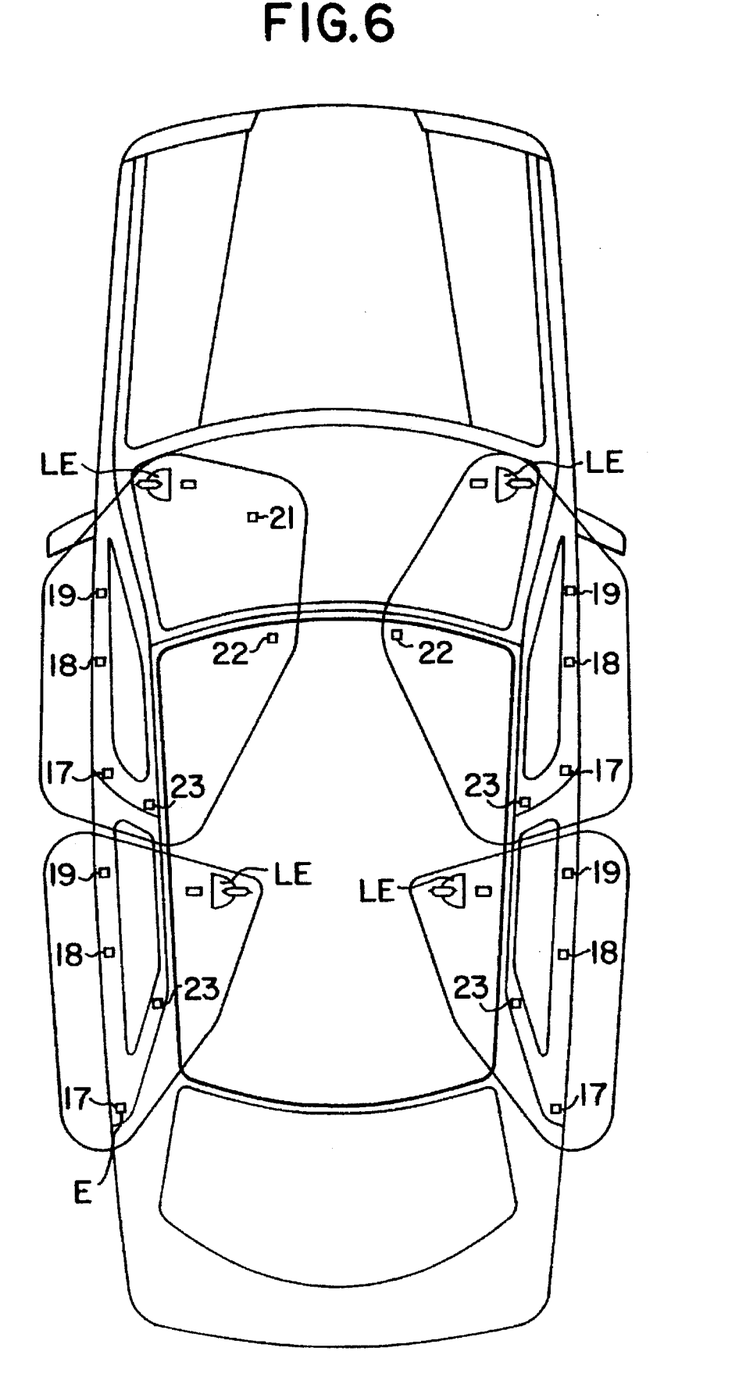
FIG. 6 is a view similar to FIG. 5 but for an entering-and-exiting-illumination function group.

The above statements are also true for the entering and exiting illumination function group depicted schematically in FIG. 6. In the embodiment depicted here, as has already been explained with regard to FIG. 5, four further light creation units LE are arranged in closed, however accessible, spaces disbursed behind the interior body covering. Each light creation unit LE is coupled with light emitting elements E via light conductors LL (which are not shown here). The light emitting elements E which are to be supplied with light from a respective light creation unit LE are, as in FIG. 5, respectively shown enclosed in an imaginary box. The light emitting elements E are for illuminating the following elements:

17 door and warning lamps
18 exiting illumination
19 door threshold
21 emission switch
22 seat adjustment
23 belt adjustment Depending upon a desired illumination function, all of the light creation units LE can be switched simultaneously and thereby form a common function group. There can be, however, also a right and left division between function groups or, however, also a front and back division between function groups, whereby activation and deactivation of the function groups and their respective light creation units LE depend upon positions of openable access elements (doors) to the interior space of the motor vehicle or upon manipulation of a switch.

Figure 7:
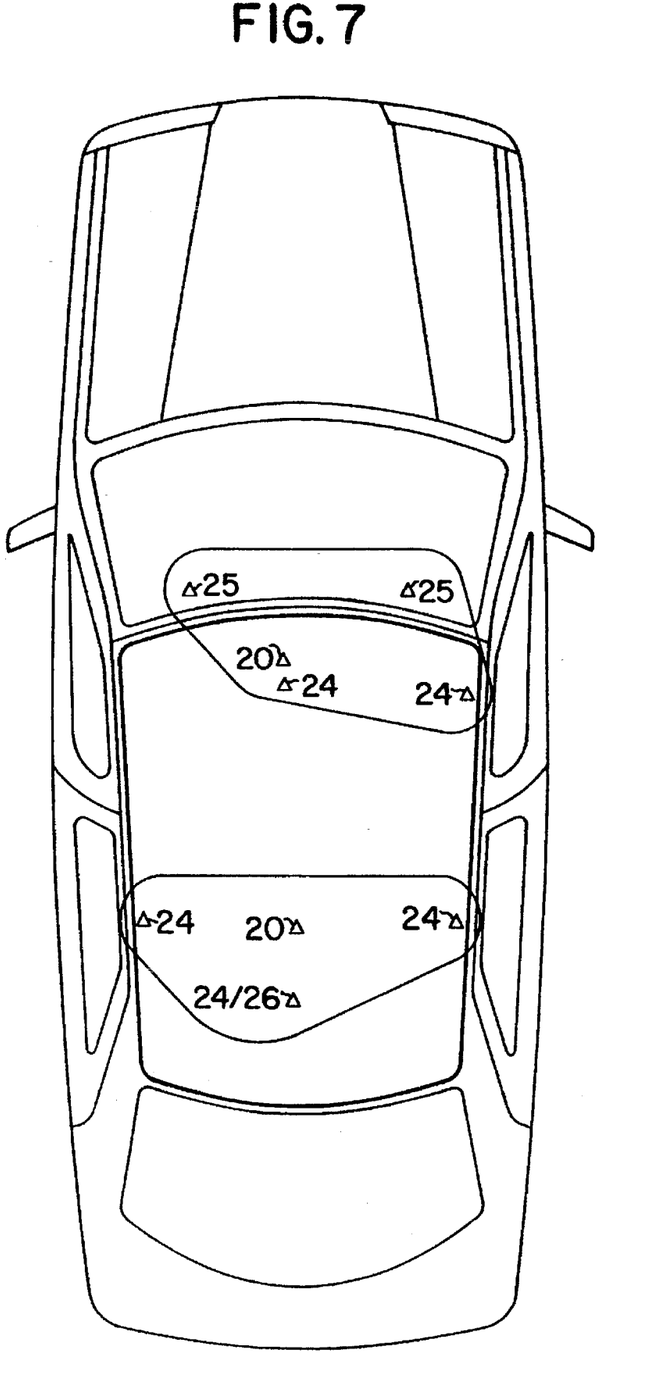
FIG. 7 is a view similar to the views of FIGS. 5 and 6 but for an arrangement of light emitting elements for a workplace-illumination function group.

FIG. 7 shows an embodiment for the arrangement of light emitting elements for working place illumination which is switched on and off by manipulation of a particular switch. The light emitting elements in FIG. 7 are for the following motor vehicle parts:

20 interior light
24 reading light
25 make-up mirror
26 non-glare general illumination.

The structures of the function groups described above and shown in FIGS. 5–7 of the light system are substantially similar in that they all include the details of FIGS. 1–4. An illumination function to be achieved and a required light amount, determines: the number of light creation units LE, the division of light in the light conductor LL and the individual light conductors EL, and the structure of the light emitting elements as direct or indirect light radiating lamps. Particularly uncomplicated and cost effective solutions for fabricating the light emitting element result if the individual light conductors EL are formed as one piece with the light emitting elements whereby a direct illumination can be achieved if the end surfaces of the individual light conductors EL can be used to directly radiate light, or, as is shown in FIG. 1, an end portion of the individual light conductors EL are used for indirectly radiating light.

Because the light system of this invention makes possible an uncomplicated electronic switching of all function groups, a dimming function to reduce light radiation, a delay switching (for example for entering and exiting illumination), or a manipulatable switch to adjust brightness (dimming) can easily be added.

In this regard, it has proven to be particularly beneficial that at least two light creation units with light conductors and light emitting elements form a function group and that the light creating units are spatially distributed in the motor vehicle to reduce the lengths of the light conductors, whereby a high energy efficiency level can be achieved during operation of the light system.

By dividing the light system into function groups, a particularly uncomplicated switching of all light sources (and thereby attached light emitting elements) for a light function is made possible.

It is beneficial that the light creation units are arranged in closed, however openable and therefore accessible, spaces behind the interior body covering because in this manner uncomplicated maintenance is made possible when individual light sources fail.

Particularly uncomplicated mounting and maintenance (for example when the body parts of the motor vehicle must be replaced or dismounted) are achieved because the light conductors are preferably separable at separation lines between two body parts or other motor vehicle parts.

In this regard, it has proven to be beneficial that the light conductors are formed to be releasable from the light creation units because, upon failure of individual light sources, the light creation units or the light sources can be replaced in a particularly uncomplicated manner. Because the light conductors are releasable from the light emitting elements, in addition to the benefit of easy mounting, also there is the benefit that the body parts, particularly parts of the interior covering of the motor vehicle, can be dismounted and mounted without a large effort.

It is beneficial that thermal uncoupling components are arranged between the light sources and the light conductors (formed as glass rods or as filter discs mounted upstream of the light conductors) whereby the thermal loads of the light conductors caused by the concentrated light rays are reduced and also, depending upon the structure of the component, a homogenizing of the light distribution is achieved.

Because a color filter is arranged between the light source and a light emitting element the benefit is achieved that individual light functions, or light functions of a function group, emit colored light.

Because the power capacity of each individual light source is smaller, or equal to, 10 Watts, a particularly beneficial thermal relationship results which provides a high energy efficient level during operation of the light system.

It is beneficial if on and off switching of the light source depends upon a measured brightness in the interior of the motor vehicle because a greater energy efficiency can be thereby achieved by avoiding an unnecessary switching on of electric use.

Because the reflectors of the light creation units are each coupled with a holding element for releasably attaching the light conductor with the light creation unit, a particularly uncomplicated and cost effective structure of the light system results.

In this regard, it is particularly beneficial that the holding element contains a thermal uncoupling component.

The invention claimed is:

1. A light system for an interior of a motor vehicle having at least first and second function groups, each function group having at least a first light creation unit which comprises an electrically activated and deactivated light source and a reflector for concentrating light from the light source, and having a first light conductor whose first end is respectively coupled to the first light creation unit for transmitting concentrated light, the first light conductor including a plurality of flexible individual light conductors (EL), with at least a first light emitting element (E) being at a second end of the light conductor for illuminating; wherein each of the first and second function groups also has at least a second light creation unit (LE) with a second light source, together with a respective second light conductor (LL) and second light emitting element (E);

there is further included means to switch on and off individually the first and second function groups, said means to switch including first and second means for simultaneously electrically switching on and off the first and second light sources (LQ) of the first and second light creation units in each of the respective first and second function groups;

the first and second light creation units of each function groups are spatially separated in the motor vehicle so as to reduce the lengths of the light conductors;

the first means for simultaneously electrically switching on and off the first and second light sources of the spatially-separated first and second light creation units of the first function group operates in response to a changing of a position of an access element for the interior of the motor vehicle;

the second means for simultaneously electrically switching on and off the first and second light sources of the spatially-separated first and second light-creation units of the second function group operates in response to a stand light being switched on and off;

whereby the first function group creates entering and exiting illumination and the second function group creates an orientation illumination.

2. A light system as in claim 1 wherein there is at least a third function group with spatially-separated first and second light creation units which are simultaneously electrically switched on and off by hand manipulation of a switch and which third function group creates work-place illumination.

3. A light system as in claim 1 wherein each of the light creation units E is arranged in a closed, however accessible, space behind an interior body covering.

4. A light system as in claim 3 wherein at least some of the light conductors include separation means for allowing said light conductors to be separated at separation lines between two body parts of the motor vehicle.

5. A light system as in claim 4 wherein at least some of the light conductors are releasably coupled to the light creation units.

6. A light system as in claim 5 wherein at least some of the light conductors are releasably coupled to the light emitting elements.

7. A light system as in claim 1 wherein a thermal uncoupling component is arranged between each of the light sources and its respective light conductors for thermally isolating the light sources from the light conductors, the thermal uncoupling components being formed as glass rods.

8. A light system as in claim 1 wherein there is a color filter between at least one of the light sources and its respective light emitting element.

9. A light system as in claim 1 wherein the power capacity of each of the individual light sources is not greater than 10 Watts.

10. A light system as in claim 1 wherein is further included a means for electrically switching on and off at least some of the light sources as a function of a light brightness measured in the interior of the motor vehicle.

11. A light system as in claim 1 wherein at least some of the reflectors of the light creation units are each coupled to a holding element for releasably attaching to the respective light conductor of the respective light creation unit.

12. A light system as in claim 11 wherein the holding element has a thermal uncoupling component.

13. A light system as in claim 1 wherein the simultaneous electrically switching off of the first and second the light sources of the spatially-separated first and second light creation units of the first function group are controlled by an electrical switch with a delay.

14. A light system as in claim 1 wherein is further included a switching means which electrically controls the brightness of the first and second light sources of the spatially-separated first and second light-creation units of the first function group when a passenger is entering and exiting the motor vehicle.

15. A light system as in claim 1 wherein thermal uncoupling components are arranged between at least some of the first and second light sources and their respective light conductors, the thermal uncoupling components being formed as filters.

\* \* \* \* \*